(12) United States Patent
Morris (10) Patent No.: US 11,524,446 B2
(45) Date of Patent: Dec. 13, 2022

(54) SYSTEMS AND METHODS FOR MONITORING A CURED-IN-PLACE PIPING PROCESS

(71) Applicant: PMW Technologies, LLC, Avon, IN (US)

(72) Inventor: Erik C. Morris, Avon, IN (US)

(73) Assignee: Innovations Amplified, LLC, Avon, IN (US)

( * ) Notice: Subject to any disclaimer, the term of this patent is extended or adjusted under 35 U.S.C. 154(b) by 323 days.

(21) Appl. No.: 16/868,275

(22) Filed: May 6, 2020

(65) Prior Publication Data

US 2021/0347106 A1    Nov. 11, 2021

(51) Int. Cl.
| | | |
|---|---|---|
| *B29C 63/00* | (2006.01) | |
| *B29C 63/34* | (2006.01) | |
| *G01K 13/00* | (2021.01) | |
| *G01K 7/22* | (2006.01) | |
| *B29C 65/50* | (2006.01) | |
| *B29C 65/48* | (2006.01) | |
| *B29C 65/00* | (2006.01) | |

(52) U.S. Cl.
CPC .......... *B29C 63/0004* (2013.01); *B29C 63/34* (2013.01); *G01K 7/22* (2013.01); *G01K 13/00* (2013.01); *B29C 65/483* (2013.01); *B29C 65/5042* (2013.01); *B29C 66/301* (2013.01); *B29C 66/5221* (2013.01); *B29C 66/612* (2013.01)

(58) Field of Classification Search
CPC ..... B29C 63/0004; B29C 63/34; B29C 63/36; B29C 65/02; B29C 65/48; B29C 65/483; B29C 65/4835; B29C 65/4845; B29C 65/50; B29C 65/5042; B29C 66/612; B29C 66/301; B29C 66/5221; G01K 7/22; G01K 13/00; G01K 1/026; F16L 55/165; F16L 55/1651; F16L 55/1652; F16L 55/1653; F16L 55/1654; E03F 2003/065

USPC ..... 156/60, 71, 94, 285, 287, 293, 294, 296, 156/297, 299, 300, 301, 302, 307.1, 156/307.7, 349, 350, 351, 359, 368, 378; 138/98

See application file for complete search history.

(56) References Cited

U.S. PATENT DOCUMENTS

| | | | | |
|---|---|---|---|---|
| 6,942,426 | B1 * | 9/2005 | Kampbell | ........... F16L 55/1654 405/184.2 |
| 7,249,525 | B1 * | 7/2007 | Engel | ........................ G01F 1/74 73/861.44 |

(Continued)

FOREIGN PATENT DOCUMENTS

EP    3062010 A1 *    8/2016

*Primary Examiner* — Philip C Tucker
*Assistant Examiner* — Brian R Slawski
(74) *Attorney, Agent, or Firm* — Quarles & Brady LLP (57) ABSTRACT

A method for monitoring a curing process of a cured-in-place pipe is disclosed. The method includes affixing a plurality of sensors to a resin layer of a liner, and determining a curing profile corresponding to at least the resin layer, the curing profile including a threshold curing value. The method further includes sensing, using the plurality of sensors, real-time data indicative of at least one curing parameter. Additionally, the method includes comparing the real-time data from each sensor to the threshold curing value, and outputting an alert upon the real-time data meeting or exceeding the threshold curing value.

20 Claims, 9 Drawing Sheets

(56) References Cited

U.S. PATENT DOCUMENTS

| | | |
|---|---|---|
| 8,940,113 B2 | 1/2015 | Lindner et al. |
| 9,328,857 B2 | 5/2016 | Conte et al. |
| 2006/0151037 A1* | 7/2006 | Lepola ................ G21C 17/017 264/269 |
| 2012/0255664 A1* | 10/2012 | Lindner ................ F16L 55/165 156/64 |
| 2014/0027000 A1* | 1/2014 | Kiest, Jr. ................ F16L 55/18 138/97 |
| 2018/0306374 A1* | 10/2018 | Barnes ................ B29C 66/5221 |
| 2019/0118460 A1* | 4/2019 | Wind ................ B29C 63/341 |

* cited by examiner

SYSTEMS AND METHODS FOR MONITORING A CURED-IN-PLACE PIPING PROCESS

BACKGROUND

Field of the Disclosure

The present disclosure relates generally to the curing of cured-in-place pipe (CIPP) liners. More specifically, the present disclosure relates to systems and methods for ensuring that a CIPP liner, as installed within a pipe, is sufficiently cured.

Description of the Background of the Disclosure

Figure 1A:
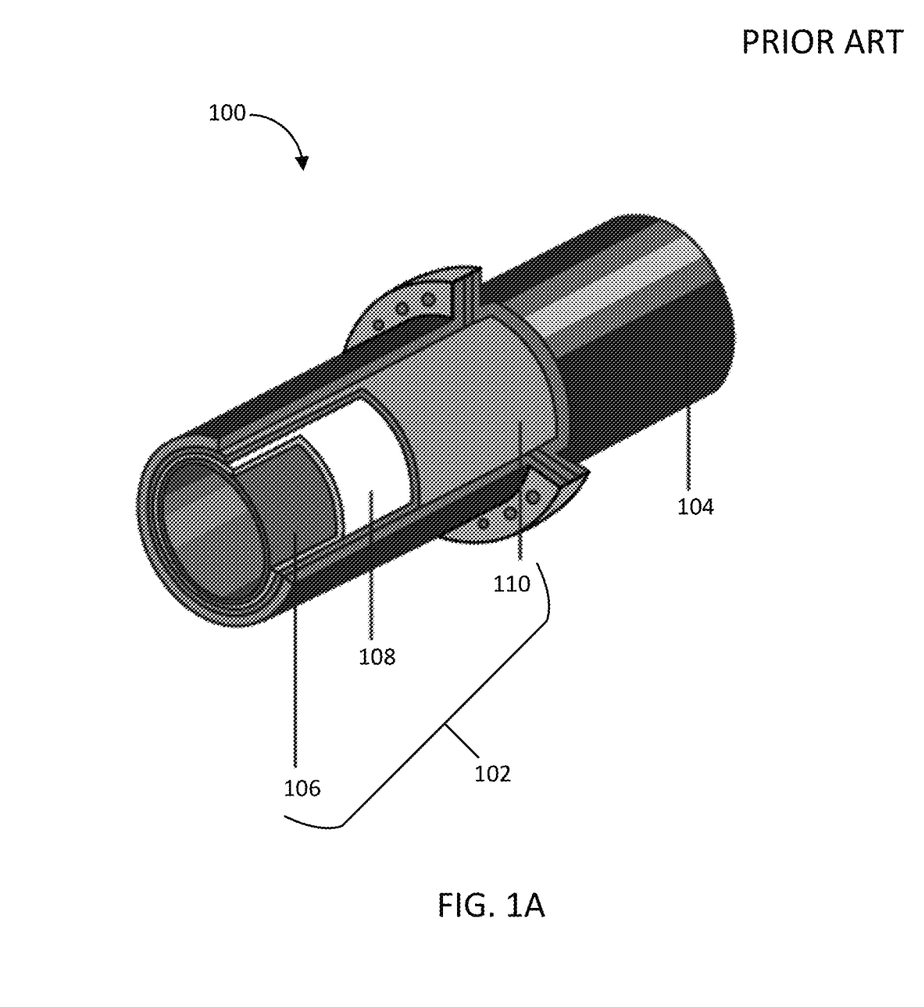
FIG. 1A is a perspective view of a known cured-in-place pipe (CIPP), as installed within an existing pipe.
Figure 1B:
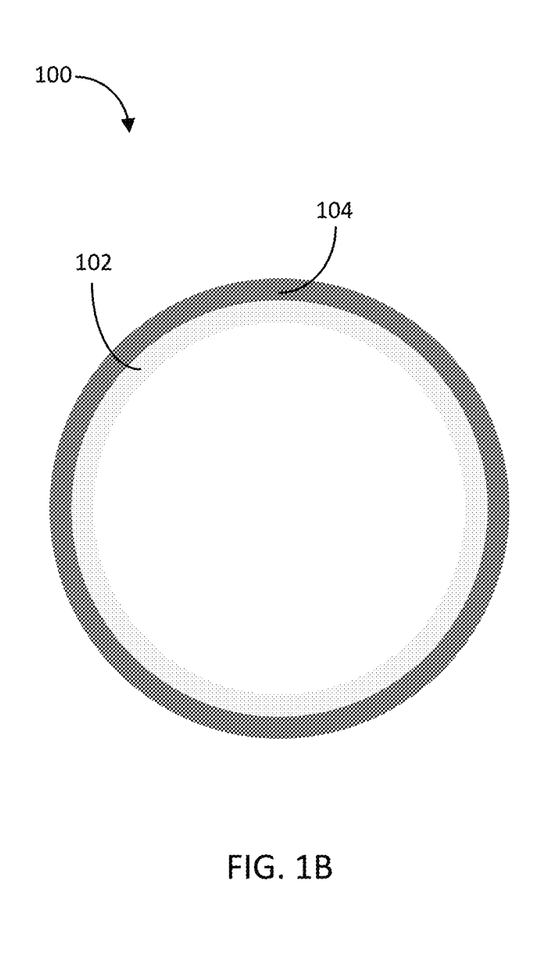
FIG. 1B is a front view of the CIPP of FIG. 1A.

In some situations, pipes (e.g., sewer pipes), are disposed in locations that are extremely difficult to access. Over time, it may become necessary to repair these pipes due to sudden damage or normal wear. Such situations are often encountered in relation to underground sewer, storm water, potable water, gas, and other utility pipes. As pipes age, for example, they may begin to leak or otherwise become structurally compromised, thus requiring replacement or repair. Replacing pipes, especially underground, can be extremely challenging and expensive. Accordingly, methods have been developed to repair pipes in locations that are difficult to access (i.e., as an alternative to complete replacement). One such method involves the use of cured-in-place pipe (CIPP) liners that can be inserted within existing pipes to essentially create a new pipe within the existing pipe. FIGS. 1A-1B illustrates an example CIPP assembly 100, as installed within an existing pipe 102. A CIPP liner 104 utilizes a flexible tube (often referred to as a sock or bag) which can include a reinforcement layer 108 disposed between a polymer backing 106, and a curable resin 110. The reinforcement layer 108 can further be impregnated with the same curable resin 110. The reinforcement layer 108 can be a woven or non-woven material. The CIPP liner 104 is used to line the inner circumference of the existing pipe 102 via an installation and curing process.

Cured-in-place pipe liners are very cost effective, as they require little or no digging (i.e., access is often only needed at the upstream and downstream ends of the pipe segment). In many situations, the access points are readily available via existing inspection chambers (i.e., "manholes"). Cured-in-place liners for sewer pipes can be installed in segments of very long lengths, reaching several miles, for example. However, segments of several hundred feet between manholes are more common.

Typically, a cured-in-place liner is delivered to a site as a hollow tube with the curable resin (e.g., curable resin 110) positioned within the tube and the polymer backing (e.g., polymer backing 106) disposed on the outside (i.e., at the inner diameter). In some cured-in-place lining operations, one end of the hollow tube is closed. The opposing open end of the hollow tube is then positioned adjacent to an end of the target pipe segment. Pressure can then be applied to the hollow tube to simultaneously evert the liner (such that the resin is positioned on the outside of the liner, and the backing is positioned on the inside of the liner), and force the hollow tube into the pipe segment (e.g., pipe 102). Other techniques for inserting the liner into the pipe include: pulling the liner with a cable from the downstream end of the target pipe segment, attaching the liner to a "pipe crawler" (i.e., a robot typically used for pipe inspection) which can travel through the pipe segment while pushing or pulling the liner, and using "water tower" eversion (i.e., creating the eversion pressure via water). When pushing or pulling techniques are used, the liner may be open at both ends.

Once the liner is positioned through the pipe segment, one or both ends of the liner can be capped to create an air-tight seal for pressurization. The liner may then be pressurized (e.g., from an open end or through a side valve), causing the liner to expand and conform to the inner wall of the existing pipe. The pressurization process can include heat, which produces an exothermic reaction to cure the liner. Accordingly, a new pipe is formed within the existing pipe, while having a comparably sized cross-section to the existing pipe (see, e.g., FIG. 1B). In some situations, the pressurization and heating can be performed by forcing pressurized hot water or steam inside the liner. The specific pressure and heating profile depends, of course, on the particular resin composition. The pressure and heat in the pipe may be measured to determine if both values stay within their prescribed ranges for a sufficient duration, thus ensuring that the exothermic reaction properly cures the resin. Notably, the resin must be maintained at a specified minimum temperature and pressure for a specified minimum period of time in order to properly cure the resin.

Therefore, what is needed are systems and methods for monitoring and/or controlling resin curing processes for cured-in-place pipes.

SUMMARY

In some aspects, the present disclosure includes a system for monitoring a curing process of a cured-in-place pipe. The system includes a liner having a resin layer, and a plurality of sensors affixed to the liner at an interface between the resin layer and an existing pipe, the plurality of sensors configured to sense at least one curing parameter. The system further includes a controller in communication with each of the plurality of sensors. The controller is configured to receive real-time data from each sensor, the real-time data indicative of the at least one curing parameter. The controller is further configured to receive a curing profile corresponding to at least the resin layer, the curing profile including a threshold curing value. Additionally, the controller is configured to compare the real-time data from each sensor to the threshold curing value, and output an alert upon the real-time data meeting or exceeding the threshold curing value.

In some aspects, the present disclosure includes a method for monitoring a curing process of a cured-in-place pipe. The method includes securing a plurality of sensors to an interface between a resin layer and an existing pipe. The method further includes determining a curing profile of the cured-in-place pipe, the curing profile including a threshold curing value. Additionally, the method includes activating the curing process, and sensing, using the plurality of sensors, real-time data indicative of at least one curing parameter. The method includes comparing the real-time data from each sensor to the threshold curing value. Additionally, the method includes terminating the curing process upon the real-time data meeting or exceeding the threshold curing value.

In some aspects, the present disclosure includes a method for monitoring a curing process of a cured-in-place pipe. The method includes affixing a plurality of sensors to a resin layer of a liner, and determining a curing profile corresponding to at least the resin layer, the curing profile including a threshold curing value. The method further includes sensing, using the plurality of sensors, real-time data indicative of at least one curing parameter. Additionally, the method includes comparing the real-time data from each sensor to the threshold curing value, and outputting an alert upon the real-time data meeting or exceeding the threshold curing value.

DETAILED DESCRIPTION

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to the embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

Unless specified or limited otherwise, the terms "mounted," "connected," "supported," "coupled," and the like are used broadly and encompass both direct and indirect mountings, connections, supports, couplings, and so on. Further, "connected" and "coupled" and the like are not restricted to physical or mechanical connections or couplings.

As described above, cured-in-place piping undergoes a curing process once the liner is placed within the existing pipe. The resin must be maintained at a specified minimum temperature and pressure for a specified minimum period of time in order to properly cure the resin. However, significant temperature variations exist can along the liner, such that a single temperature gauge may not provide sufficient information to confirm that the temperature is within the prescribed range for proper curing along the entire length of the liner. This is particularly challenging for liners extending through greater lengths (e.g., 300 feet, 400 feet) of piping. Notably, if the liner is not completely cured over its full length, the entire operation may be compromised.

Many factors can contribute to temperature variations within the lining. As an example, poor fluid circulation can result in uneven heat distribution throughout the liner. Temperature variation within a pipe segment may also be caused by different portions of a pipe segment passing through different environments (e.g., corresponding to different thermal profiles). By way of example, one portion of a pipe segment may extend beneath a river, while another portion extends beneath a roadway. The pipe portion beneath the roadway is likely to experience higher temperatures than the pipe portion beneath the river, because the water in the river can act as an efficient heat sink (especially in colder climates).

If the entire length of the liner has not been properly cured, the installation may be jeopardized. Accordingly, it is desirable to ensure that the entire length of the liner has been sufficiently cured.

Some existing CIPP monitoring systems utilize fiber optic cables to transmit measurement data through the pipe. However, fiber optic cables are very expensive and are prone to failing at high pressures (which occur during the resin curing process). Other existing CIPP monitoring systems utilize thermocouple wires and/or metallic cable wires. Both wire types are expensive to implement, bulky (which can cause issues in small diameter pipes), and prone to failure. As an example, failure can occur when the wires incidentally make an electrical ground with a metallic pipe or metallic material within the pipe. As another example, the rigidity of the wires can result in damage during the above-described liner installation processes (e.g., eversion of the liner). Accordingly, an improved system for monitoring a resin curing process is disclosed herein.

According to aspects of the present disclosure, a cured-in-place pipe installation can utilize a curing profile to ensure that the liner is sufficiently cured. The curing profile can include a threshold value for curing temperature, a threshold value for curing pressure, and/or a threshold value for curing time, among other things. Alternatively, the curing profile can include a range of curing temperatures, a range of curing pressures, and/or a range of curing times. Notably, the curing profile can depend on aspects of the particular cure-in-place pipe. As an example, different resins may take longer to cure, or require higher temperatures.

The present disclosure includes sensors that can be disposed along an existing pipe. In some configurations, the sensors can measure temperature and/or pressure at a particular location. In some aspects, the sensors can be wired to a controller. Alternatively, the sensors can wirelessly communicate to a controller. According to some aspects of the present disclosure, the sensors can be embedded within a film and adhered to the cured-in-place pipe liner. The film can be a strip which includes multiple wired sensors, as an example.

Various methods may be used to install the sensors along the existing pipe. In some situations (e.g., where the film extends along the pipe in a single strip), the film may be adhered along the liner prior to placement of the liner within the pipe. Alternatively, individual sensors (e.g., wireless sensors) may be attached to discrete portions of the liner prior to placement of the liner within the pipe. In some configurations, the sensors may be installed along the pipe without the film. In some situations, the sensors may be placed directly within the pipe, prior to the liner placement. This can be done via the "pipe crawler," (as described above), as an example.

According to some aspects of the present disclosure, the sensors can be in wired or wireless communication with a controller. As will be described, the controller can store various parameters relating to the curing process. For example, the controller can store curing profiles, sensor data, material properties of various resins, temperature readings over time, and/or pressure readings over time. The controller can be configured to receive data from the sensors, as well as to analyze data to track a curing process. In some aspects, the controller can provide real-time feedback to a user, such as notifying the user when the curing process is complete. Additionally, the controller can be configured to activate and/or stop the curing process, in response to received sensor data. In some situations, the controller can be disposed above ground, for example, near a pipe end. This may be advantageous when using wired sensors. According to some aspects, the controller may communicate with user devices (e.g., remote use devices), to assist in the monitoring of the curing process.

Figure 2:
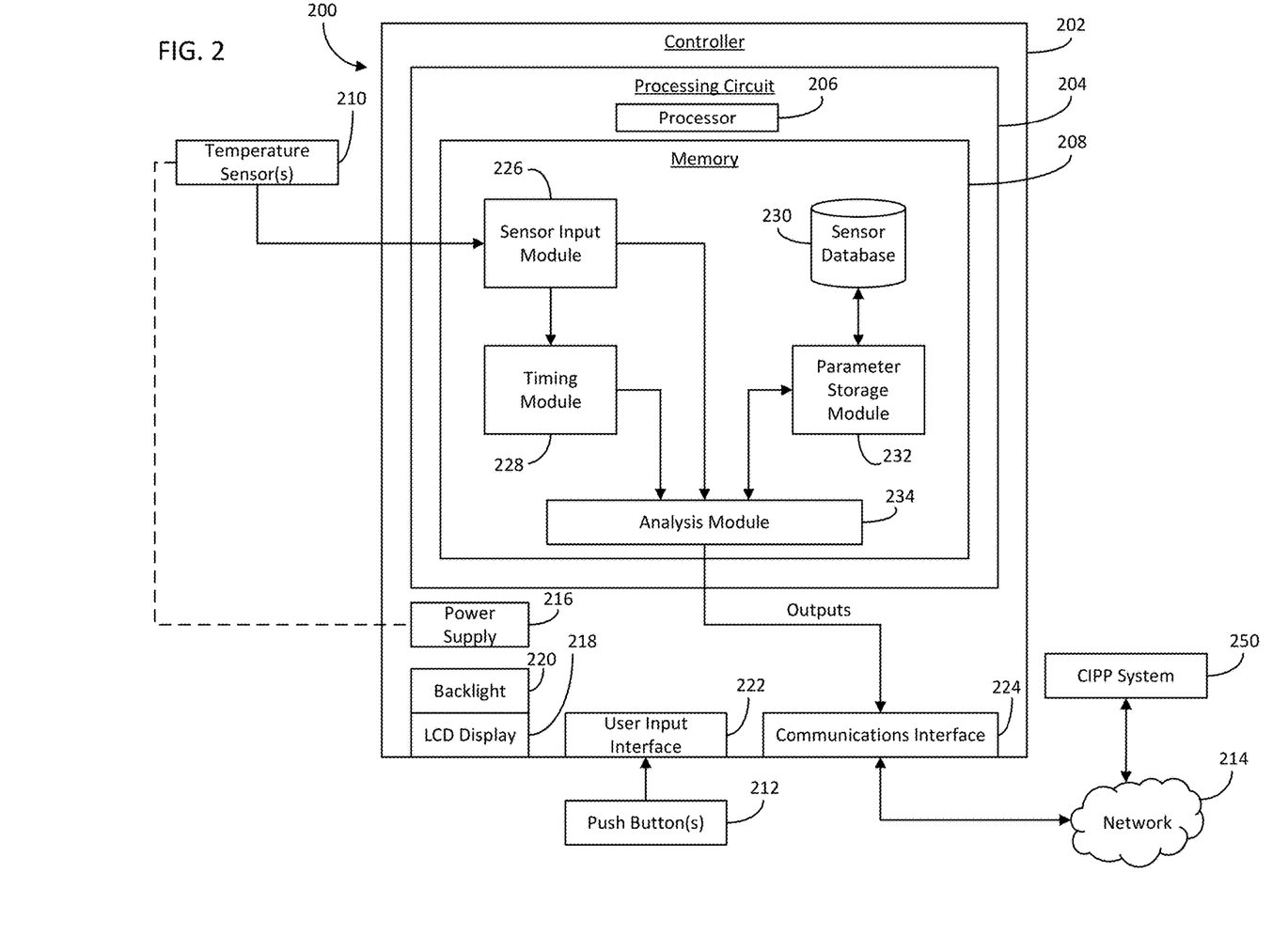
FIG. 2 is a block diagram of a control system for use with cured-in-place pipes, according to some aspects of the present disclosure.
Figure 3:
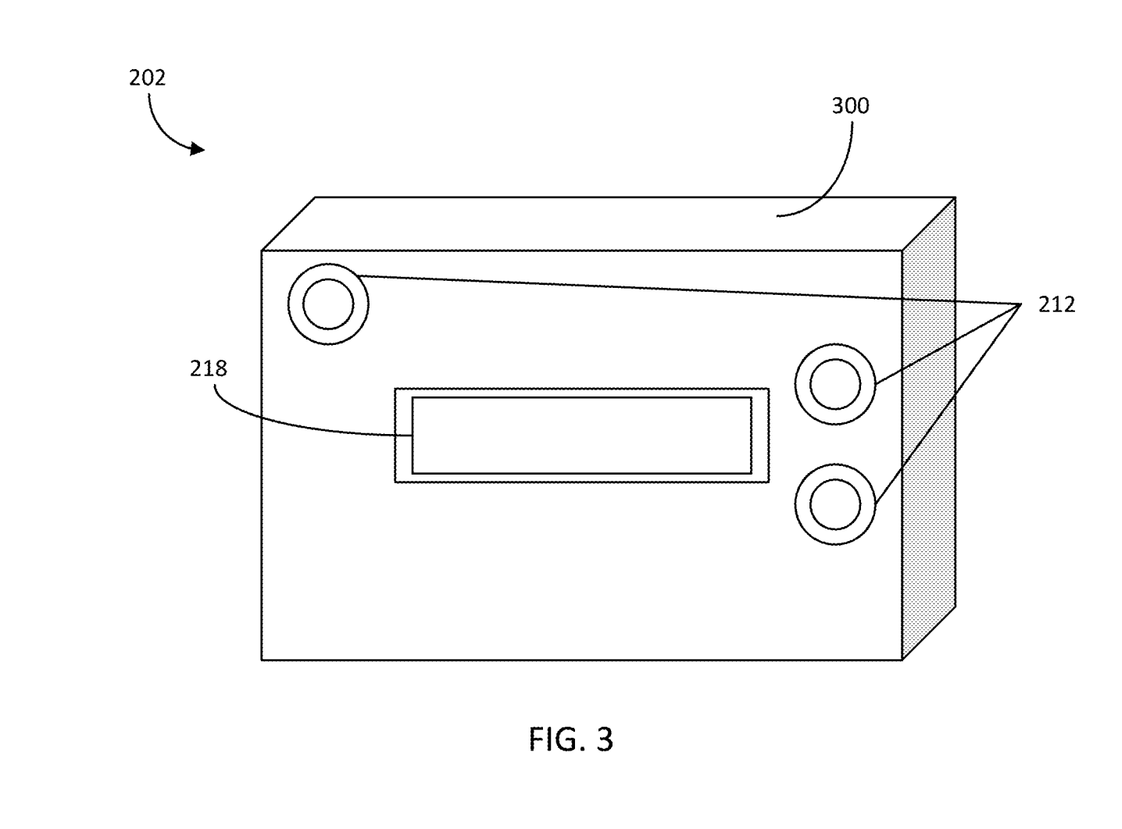
FIG. 3 is a front perspective view of a control box corresponding to the control system of FIG. 2, according to some aspects of the present disclosure.

Referring now to FIGS. 2-3, a control system 200 is shown to include a controller 202 having various inputs and outputs, according to some aspects of the present disclosure. The controller 202 can be located proximal to the existing pipe, and can be configured to measure one or more variable states or conditions (i.e., curing conditions) within the pipe. For example, the control system 200 is shown to include a temperature sensor(s) 210, which can be configured to measure temperature. The controller 202 can process the inputs provided by temperature sensor(s) 210 to determine appropriate control actions for a cured-in-place piping (CIPP) process. For example, the controller 202 can determine whether to activate or deactivate the application of steam and/or hot water to the CIPP liner. Accordingly, the controller 202 can generate control signals for a CIPP system 250 based on the determined control actions, and can output the generated control signals to the CIPP system 250 via communications interface 224.

The controller 202 is shown to include a variety of electronic components contained within a housing 300. FIG. 3 is an illustrative example of the controller 202 and housing 300, however various sizes, structures, and features are expressly contemplated. Referring now to FIG. 2, in one example, the controller 202 is shown to include a processing circuit 204, a power supply 216, a communications interface 224, and user interface components (e.g., an LCD display 220, a backlight 218 for LCD display 220, and a user input interface 222). In various embodiments, power supply 216 can be an internal power supply (e.g., batteries) or an interface for receiving power from an external power source. As shown, the power supply 216 can optionally provide power to the temperature sensor(s) 210 (e.g., for wired temperature sensors). The LCD display 220 can be an electronic display (e.g., a graphical display, an alpha-numeric display, etc.) configured to present information to a user. The LCD display 220 may be used to display, for example, the current readings from temperature sensor(s) 210. Backlight 218 can provide backlighting for LCD display 220 and may be illuminated at various levels of brightness. User input interface 222 can include any of a variety of a user input devices (e.g., push button(s) 212, a keypad, a touch-sensitive display, etc.) for receiving user input. The user input interface 222 can facilitate user interaction with the controller 202, and can allow a user to adjust various parameters stored within the controller 202. In some configurations, the controller 202 may not include a display (e.g., LCD display 220). Additionally or alternatively, data may be wirelessly transmitted from the controller 202 to a network accessible by various servers, display devices, and/or user devices. For example, the controller 202 may be in one-way or two-way communication with a wired or wireless handheld device, the latter being accomplished via one or more cellular and/or radio-type (Bluetooth, WiFi, Zigbee, etc.) transceivers. Such external devices can be configured to display information, and in some aspects, can accept user inputs that are subsequently transmitted to the controller 202.

The controller 202 can provide a variety of control outputs. Control outputs may be selectively activated or deactivated by processing circuit 204 (e.g., by analysis module 234) to provide a control signal to communications interface 224. Communications interface 224 may include wired or wireless interfaces (e.g., jacks, antennas, transmitters, receivers, transceivers, wire terminals, etc.) for conducting electronic data communications with the CIPP system 250 or other external systems or devices. Such communications can be direct (e.g., local wired or wireless communications) or via a communications network 214 (e.g., a WAN, the Internet, a cellular network, etc.). For example, communications interface 224 can include an Ethernet card and port for sending and receiving data via an Ethernet-based communications link or network. In another example, communications interface 224 may include one or more radio (e.g., WiFi, Bluetooth, Zigbee, etc.) transceivers or a cellular or mobile phone communications transceiver for communicating via a wireless communications network. Communications interface 224 can be communicably connected to processing circuit 204 such that processing circuit 204 and the various components thereof can send and receive data via communications interface 224.

Processing circuit 204 is shown to include a processor 206 and memory 208. Processor 206 can be implemented as a general purpose processor, an application specific integrated circuit (ASIC), one or more field programmable gate arrays (FPGAs), a group of processing components, or other suitable electronic processing components. Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described herein. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

Still referring to FIG. 2, memory 208 is shown to include a sensor input module 226. Sensor input module 226 may receive and store inputs (i.e., data points) from temperature sensor(s) 210. In some aspects, sensor input module 226 converts the input data from each of the temperature sensor(s) 210 into units that quantify the variable measured. For example, temperature sensor(s) 210 may be a thermistor that provides sensor input module 226 with a voltage representing a measured temperature. Sensor input module 226 may convert the voltage into units of temperature using a conversion chart or formula. Sensor input module 226 may perform a similar conversion procedure (if necessary) for the data from any additional sensors (e.g., pressure sensors).

Sensor input module 226 can store the data points with attributes that describe the type of data (e.g., temperature, pressure), the unit of measure (e.g., degrees Fahrenheit, degrees Celsius, etc.), the data source (e.g., a particular sensor or pipe zone), a time at which the data point is measured, and/or other attributes that describe the data points or the physical state or condition represented by the data points in some aspects. As shown in FIG. 2, sensor input module 226 may provide the data points (e.g., the measured temperature, measured pressure) to analysis module 234 and timing module 228.

Still referring to FIG. 2, memory 208 is shown to include the timing module 228, which can receive data from the sensor input module 226, according to some aspects of the present disclosure. In some aspects, the timing module 228 can correlate each measured data point with the time at which the data is measured. The timing module 228 can additionally track the time between measurements and occurrence times for various events within a CIPP process. As an example, the timing module 228 may store a time corresponding to the start of a CIPP process. Similarly, the timing module 228 may calculate runtime of the CIPP process and may store a time corresponding to the stop of a CIPP process. As shown in FIG. 2, the timing module 228 can provide data (e.g., the correlated data and time of measurement, start time, etc.) to the analysis module 234.

Memory 208 is further shown to include a sensor database 230, which can communicate with a parameter storage module 232, according to some aspects of the present disclosure. The sensor database 230 can be configured to store parameters associated with the temperature sensor(s) 210 (and optionally, additional sensors). As an example, the sensor database 230 can store information relating to the type of sensor, sensor address, and relative sensor position along the liner, among other things. As will be described, various sensor types and configurations can be implemented in the control system 200. In some sensor configurations, the sensor database 230 can store address information for each sensor. The address can be a MAC address or other network-applicable address format, for example. The relative sensor position along the liner can include for example, a physical positon indicator (e.g., feet or meters from the liner end), a position relative to the other sensors, or the "zone" corresponding to the sensor.

As will be described, the CIPP liner may be divided into discrete zones, each zone having one or more sensors (e.g., temperature sensor(s) 210). Accordingly, the controller 202 can analyze the curing process as a function of each zone. The sensor database 230 can further store parameters associated with each zone. As an example, each zone may be defined by a distance range from the end of the liner (e.g., zone A corresponds to 0-100 feet, zone B corresponds to 100-200 feet, etc.). Sensors may be assigned to zones (e.g., sensors 1-2 correspond to zone A, sensors 3-4 correspond to zone B, etc.). Utilizing zones advantageously allows for planning of varying pipe conditions. As described above, weather and physical proximity to roads, rivers, etc., can influence the temperature of pipe segments. Accordingly, as an example, a pipe segment within a zone proximal to a river may require more time to reach a minimum threshold temperature, when compared to a pipe segment within a zone proximal to a roadway. In addition to accounting for varying pipe conditions, implementing pipe zones can help alert a user to a localized problem (e.g., excessive pressure, insufficient temperature, etc.). For long pipe segments, a binary "pass/fail" of the curing process may result in a substantial amount of troubleshooting. Accordingly, individual zone data can increase troubleshooting efficiency.

As shown, memory 208 includes a parameter storage module 232, which can receive data from the sensor database 230. Parameter storage module 232 may store various parameters used in the monitoring and/or control of the CIPP process (e.g., associated with a curing profile). Parameters stored by parameter storage module 232 may include resin properties, a threshold value for curing temperature, a threshold value for curing pressure, and a threshold value for curing time, among other things. In some configurations, the parameters can include a range of curing temperatures, a range of curing pressures, and a range of curing times, among other things. According to some aspects, the parameter storage module 232 can be updated or modified via the user input interface 222 and/or the communications interface 224.

Still referring to FIG. 2, memory 208 is shown to include the analysis module 234, which can receive data from the parameter storage module 232, the sensor input module 226, and the timing module 228. Additionally, as shown, the analysis module 234 can provide outputs (e.g., analysis results, control outputs) to the communications interface 224. In some aspects, the analysis module 234 can synthesize sensor data, timing data, and the curing profile, to determine a status of the curing process. In some situations, the analysis module 234 can provide real-time feedback, based on continuous sensor readings during the curing process.

In operation, the analysis module 234 can compare real-time temperature data (e.g., from the sensor input module 226) and timing data (e.g., from the timing module 228) to the curing profile. As an example, the analysis module 234 can determine when a measured temperature is less than, greater than, or equal to the threshold value for curing temperature. Further, the analysis module can determine the time at which the measured temperature reached the threshold curing temperature, as well as the time elapsed while above the threshold curing temperature. Similarly, the analysis module 234 can determine when a measured pressure is less than, greater than, or equal to the threshold value for curing pressure. Further, the analysis module can determine the time at which the measured pressure reached the threshold curing pressure, as well as the time elapsed while above the threshold curing pressure.

According to some aspects of the present disclosure, the analysis module 234 can monitor individual zones and/or the entirety of a sensor network. As an example, the analysis module 234 can determine if one zone is at a lower temperature (e.g., beneath the curing temperature threshold) relative to the other zones. As another example, the analysis module 234 can determine if at least one zone has failed to reach the curing temperature threshold, by analyzing a single temperature output that encompasses data from several temperature sensors 210. The analysis module 234 can provide outputs to the CIPP system 250 via the communications interface 224. In some aspects, the CIPP system 250 can update control parameters (e.g., applied temperature, applied pressure) in response to receiving outputs from the analysis module 234.

As described above, the CIPP resin must be maintained at a minimum temperature and pressure for a minimum period of time in order to properly cure the resin. The analysis module 234 can determine when the minimum curing requirements have been satisfied. As an example, the analysis module 234 can monitor the time elapsed since all zones reached the minimum temperature and pressure thresholds. Once the minimum period of time has elapsed, the analysis module 234 can generate an output. The output can be, for example, a control output for the CIPP system 250, a user alert via the LCD display 220, or an output to a user device via the network 214.

Figure 4A:
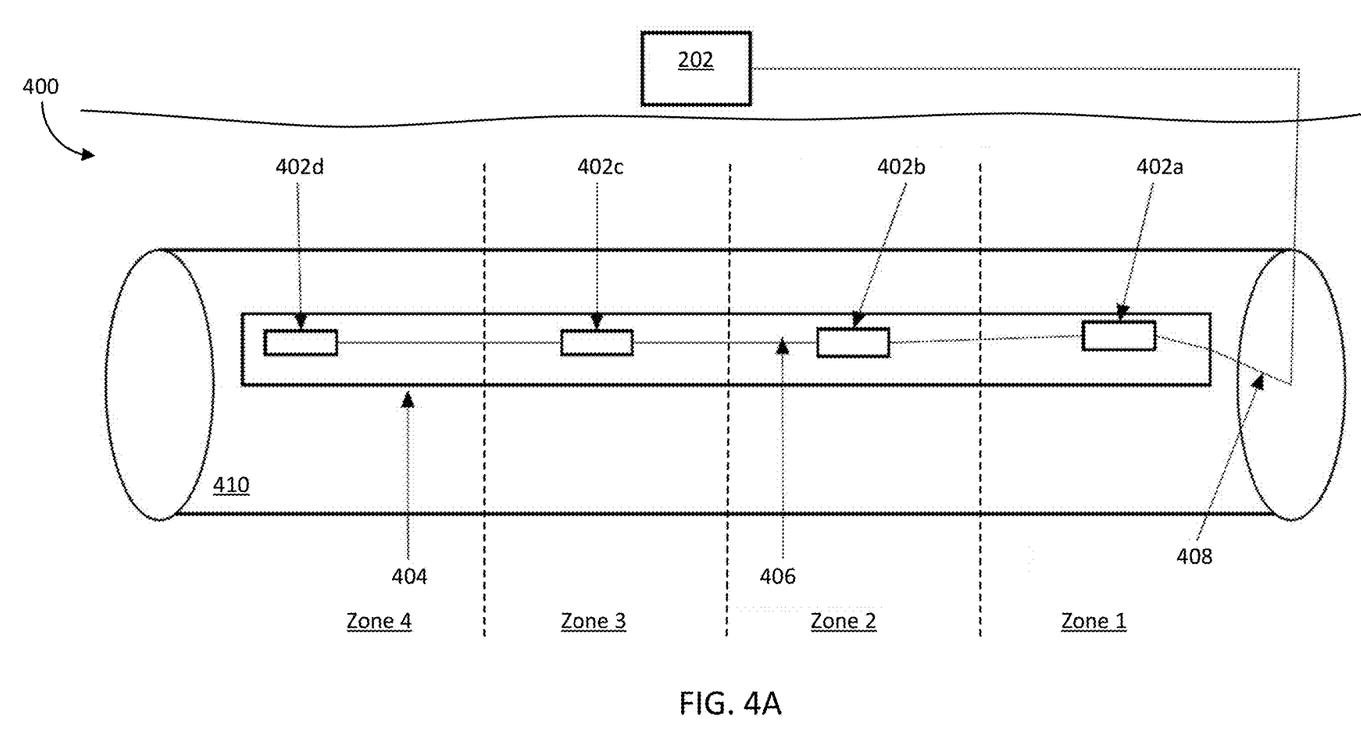
FIG. 4A is a block diagram of a control system as installed in a cured-in-place pipe, according to aspects of the present disclosure.

Referring now to FIGS. 4A-4D, a control system 400 as installed in a cured-in-place pipe is shown, according to aspects of the present disclosure. Referring specifically to FIG. 4A, the control system 400 is shown to include the controller 202 (which can be located above-ground, or otherwise proximal to the CIPP). As shown, temperature sensors 402a, 402b, 402c, 402d (e.g., temperature sensor(s) 210) can be disposed along a pipe 410 (i.e., an existing pipe) via a strip 404. According to some aspects, the strip 404 can be adhered to a pipe wall (i.e., positioned between the pipe 410 and the CIPP). Alternatively, the strip 404 can be adhered to an exterior surface to the CIPP, still being disposed between the pipe 410 and the CIPP. During the installation of the CIPP within the pipe 410, the pressure of expanding the CIPP liner (as described above) can firmly secure the placement and position of the strip 404 (and accordingly, the temperature sensors 402) between the pipe 410 and the CIPP liner.

As shown in FIG. 4A, the temperature sensors 402a, 402b, 402c, 402d can be connected to one another via wire(s) 406. Additionally, the strip 404 and temperature sensors 402 can be connected to the controller 202 via wire(s) 408. In some configurations, the wire(s) 406 can extend along the entire length of the pipe 410, and thus, along the entire length of the CIPP liner. The controller 202 (e.g., via the sensor input module 226) can receive temperature measurements from the temperature sensors 402, via the wire(s) 408. Wire(s) 406 and wires(s) 408 are explained in greater detail below, with respect to FIGS. 4C and 4D.

As previously described, the pipe 410 may be divided into a plurality of zones. As shown by FIG. 4A, each zone can include one or more temperature sensors 402. As an example, "zone 1" can correspond to temperature sensor 402a, "zone 2" can correspond to temperature sensor 402b, "zone 3" can correspond to temperature sensor 402c, and "zone 4" can correspond to temperature sensor 402d. Additional temperature sensors 402 and, optionally, additional zones can be included in the control system 400. The controller 202 can store information corresponding to the temperature sensors 402 and the various zones within the sensor database 230 (as described above).

Figure 4B:
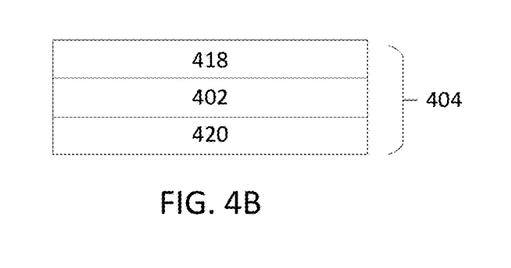
FIG. 4B is a side cross-sectional view of a sensor within the control system of FIG. 4A, according to some aspects of the present disclosure.

Referring specifically to FIG. 4B, a side cross-sectional view of the temperature sensor 402 is shown as installed within the strip 404, according to some aspects of the present disclosure. As shown, strip 404 can include the temperature sensor(s) 402 disposed between a film 418 and an adhesive 420. In some configurations, the wire(s) 406 and/or wire(s) 408 can extend between the film 418 and the adhesive 420. The adhesive 420 can attach the strip 404 to the wall of the pipe 410. Accordingly, the film 418 can contact the CIPP liner. As an example, the film 418 can be a poly-based thin film which can be non-conductive. The film 418 can be rated to a curing temperature (e.g., 200 degrees Celsius). The adhesive 420 can be natural or synthetic rubber, acrylic-, urethane-, or silicone-based, among other adhesive types. Strip 404 can be adhered to the wall of the pipe 410. Accordingly, strip 404 can be attached or adhered such that contact with the CIPP liner occurs.

In some implementations, the system 400 can be configured without the film 418. Wires and a corresponding temperature sensor 402 can be disposed on a disc configured with a quick-connect interface. The disc can include adhesive 420 (e.g., as an adhesive backing). Accordingly, each temperature sensor 402 can be individually adhered to the wall of the pipe 410. Wire(s) 406 can be disposed along the pipe 410, and the quick-connect interface can connect to each disc (e.g., for communication, power, etc.).

Figure 4C:
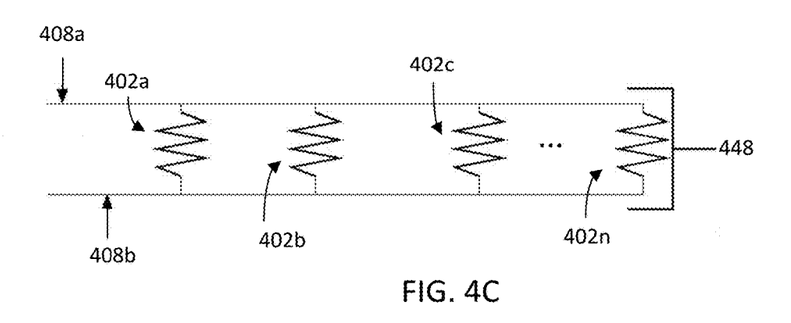
FIG. 4C is a schematic view of the sensors of FIG. 4B, according to some aspects of the present disclosure.

Referring specifically to FIG. 4C, a schematic view of the temperature sensors 402a, 402b, 402c, 402d is shown, according to aspects of the present disclosure. Each of the temperature sensors 402 can be part of a sensor network 448. The sensor network 448 can be expanded to include additional temperature sensors 402 (i.e., up to temperature sensor "402n"). In some aspects, the temperature sensors 402 can be configured in parallel (as shown in FIG. 4C), with wires 408a, 408b extending from the controller 202 and through the strip 404. Each temperature sensor 402 can be connected to wires 408a, 408b. Alternatively, in some aspects, the temperature sensors 402 can be implemented with one leg on one wire (common), and individual control wires for each temperature sensor 402 wired back to the controller 202.

Figure 4D:
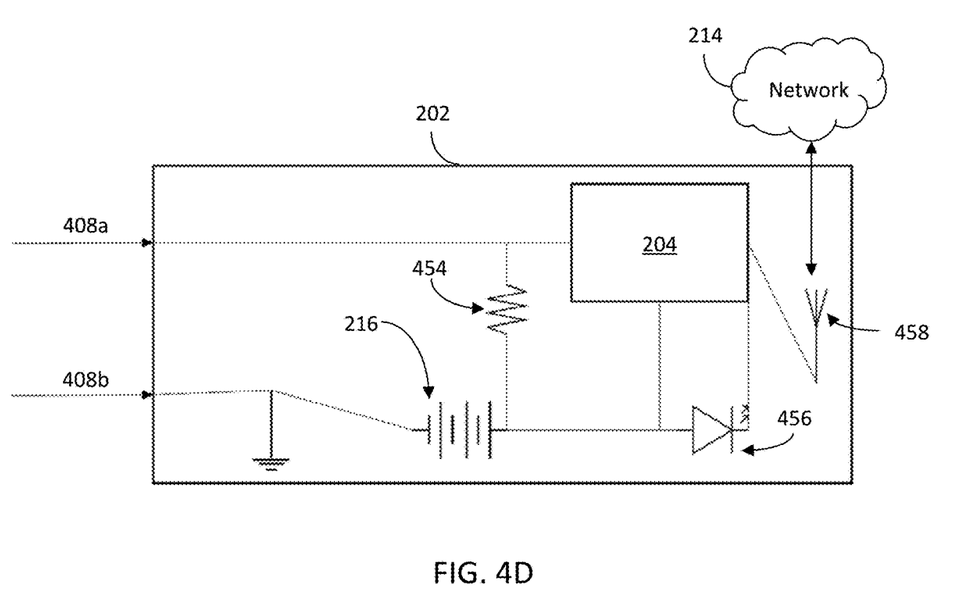
FIG. 4D is a schematic view of a controller within the control system of FIG. 4A, according to aspects of the present disclosure.

FIG. 4D shows a schematic view of the controller (processing circuit 204) within the control system 400, according to aspects of the present disclosure. The wires 408a, 408b can extend from the strip 404 to the controller 202. As shown, power can be supplied to the temperature sensors 402 (via wires 408a, 408b) from the power supply 216. A resistor 454 having a known value (e.g., as stored within the sensor database 230), can be connected in parallel with the processing circuit 204, such that a total circuit resistance (including the temperature sensors) can be determined. The controller can further include a power indicator (e.g., LED power indicator 456), which may be visible through the controller housing 300. As shown, the processing circuit 204 can provide outputs to the network 214. This can be done via a wired or wireless connection (e.g., antenna 458).

According to the present disclosure, the control system 400 can be configured as a "go/no go" system. In a go/no go implementation, the temperature sensors 402 can be switching positive temperature coefficient (PTC) thermistors (herein, "switching PTCs"). Upon reaching a predetermined temperature (here, a minimum curing temperature), a switching PTC changes resistance. In some situations, the minimum curing temperature may be 150 degrees Celsius. Alternatively, the minimum curing temperature may be higher than 150 degrees Celsius, such as 200 degrees Celsius. The minimum curing temperature may be selected based on the specific resin type and curing parameters. In some configurations, the switching PTCs can increase to a resistance above 1 megaohm in response to the temperature change.

As described above, the switching PTCs can be placed in parallel along the pipe 410. The controller 202 can then calculate a total resistance corresponding to the sensor network 448 (e.g., via sensor input module 226) using Equation 1:

$$R_T = \frac{1}{\frac{1}{R_a} + \frac{1}{R_b} + \frac{1}{R_c} + \frac{1}{R_d} + \ldots + \frac{1}{R_n}}$$

where $R_T$ is the total resistance, and $R_a$-$R_n$ are the resistance of temperature sensors 402a-402n.

Additionally, the controller 202 can detect the resistance change of the switching PTCs within the sensor network 448, which is associated with a temperature change at the pipe-liner interface. In some configurations, the switching PTCs can be placed and associated with different pipe zones.

Operationally, if a single zone fails to reach the predetermined temperature, the controller 202 can output a "no go" status (e.g., via the communications interface 224), indicating that the entire length of pipe has failed to reach the minimum curing temperature. This can occur, in part, as a result of the parallel circuit configuration. The no go status can be displayed via the LCD display 220, and/or transmitted via the network 214 to the CIPP system 250. Additionally, the network 214 can transmit the no go status (and related data) to a remote user device. In some implementations, a no go status can prompt the CIPP system 250 to maintain or update a control parameter. As an example, the CIPP system 250 may increase a temperature output in response to receiving a no go status.

Operationally, if all zones reach the predetermined temperature (e.g., the minimum curing temperature), the controller 202 can output a "go" status (e.g., via the communications interface 224), indicating that the entire length of pipe has reached the minimum curing temperature. Similar to the no go status, the go status can be displayed via the LCD display 220, and/or transmitted via the network 214 to the CIPP system 250. Additionally, the network 214 can transmit the go status (and related data) to a remote user device. In some implementations, a go status can prompt the CIPP system 250 to maintain or update a control parameter. As an example, the CIPP system 250 may maintain a temperature output in response to receiving a go status. The sensor input module 226 within the controller 202 can communicate with the timing module 228 to determine elapsed time since reaching the minimum curing temperature. This data can subsequently be provided to the analysis module 234, which can analyze the curing process in real-time.

According to the present disclosure, the control system 400 can be configured as a temperature reporting system. In a temperature reporting implementation, the temperature sensors 402 can be silistor PTC thermistors (herein, "silistor PTCs). Silistor PTCs have a linear relationship with temperature versus resistance: as temperature increases, the resistance increases in a controlled manner (specific mathematical equation provided by the manufacturer).

In some aspects of the temperature reporting system, the silistor PTCs can be placed in parallel along the pipe 410. The controller 202 can then calculate a corresponding total resistance to the sensor network 448 (e.g., via sensor input module 226). Additionally, the controller 202 can detect the resistance changes of the silistor PTCs within the sensor network 448, which is associated with the temperature changes at the pipe-liner interface. In some configurations, the silistor PTCs can be placed and associated with different pipe zones. Each silistor PTC can represent a zone. As an example, a 100 foot pipe may be divided into 10 zones, each spanning a distance of 10 feet. Each of the 10 zones can have a corresponding silistor PTC. In such a configuration, the controller 202 can determine an average resistance between all silistor PTCs. Thus, a single low resistance value (indicating low temperature) can lower the average resistance (indicating a potential issue with the curing process). In some aspects, the resistance calculations can occur via the sensor input module 226 of the controller 202.

Operationally, the average resistance can be converted to temperature, and displayed via the LCD display 220. If the average temperature fails to reach a predetermined threshold, the controller 202 can output a status indicator. The status indicator can be displayed via the LCD display 220, and/or transmitted via the network 214 to the CIPP system 250. Additionally, the network 214 can transmit the status indicator (and related data) to a remote user device. In some implementations, a failure to reach the threshold temperature can prompt the CIPP system 250 to maintain or update a control parameter. As an example, the CIPP system 250 may increase a temperature output in response to receiving the status indicator.

Operationally, if the average temperature reaches the predetermined threshold, the controller 202 can output a status indicator. The status indicator can be displayed via the LCD display 220, and/or transmitted via the network 214 to the CIPP system 250. Additionally, the network 214 can transmit the status indicator (and related data) to a remote user device. In some implementations, reaching the threshold temperature can prompt the CIPP system 250 to maintain or update a control parameter. As an example, the CIPP system 250 may maintain a temperature output in response to receiving the status indicator. The sensor input module 226 within the controller 202 can communicate with the timing module 228 to determine elapsed time since reaching the threshold temperature (e.g., minimum curing temperature). This data can subsequently be provided to the analysis module 234, which can analyze the curing process in real-time.

In some aspects of the temperature reporting system, the silistor PTCs can be placed along the pipe 410, with one leg on one wire (common), and individual control wires for each silistor PTC wired back to the controller 202. A plurality of wire(s) 408 can accordingly extend from the strip 404. In this implementation, the controller 202 can be configured to monitor each zone, independent of the other zones.

Operationally, the resistance from each silistor PTC can be converted to temperature, and displayed via the LCD display 220. If one of the zones fails to reach a predetermined threshold, the controller 202 can output a status indicator. The status indicator can be displayed via the LCD display 220, and/or transmitted via the network 214 to the CIPP system 250. Additionally, the network 214 can transmit the status indicator (and related data) to a remote user device. In some implementations, a failure to reach the threshold temperature can prompt the CIPP system 250 to maintain or update a control parameter. As an example, the CIPP system 250 may increase a temperature output in response to a zone failing to reach the threshold temperature. In some implementations, all of the zones reaching the threshold temperature can prompt the CIPP system 250 to maintain or update a control parameter. As an example, the CIPP system 250 may maintain a temperature output in response to receiving the status indicator. The sensor input module 226 within the controller 202 can communicate with the timing module 228 to determine elapsed time since reaching the threshold temperature (e.g., minimum curing temperature). This data can subsequently be provided to the analysis module 234, which can analyze the curing process in real-time.

Figure 5A:
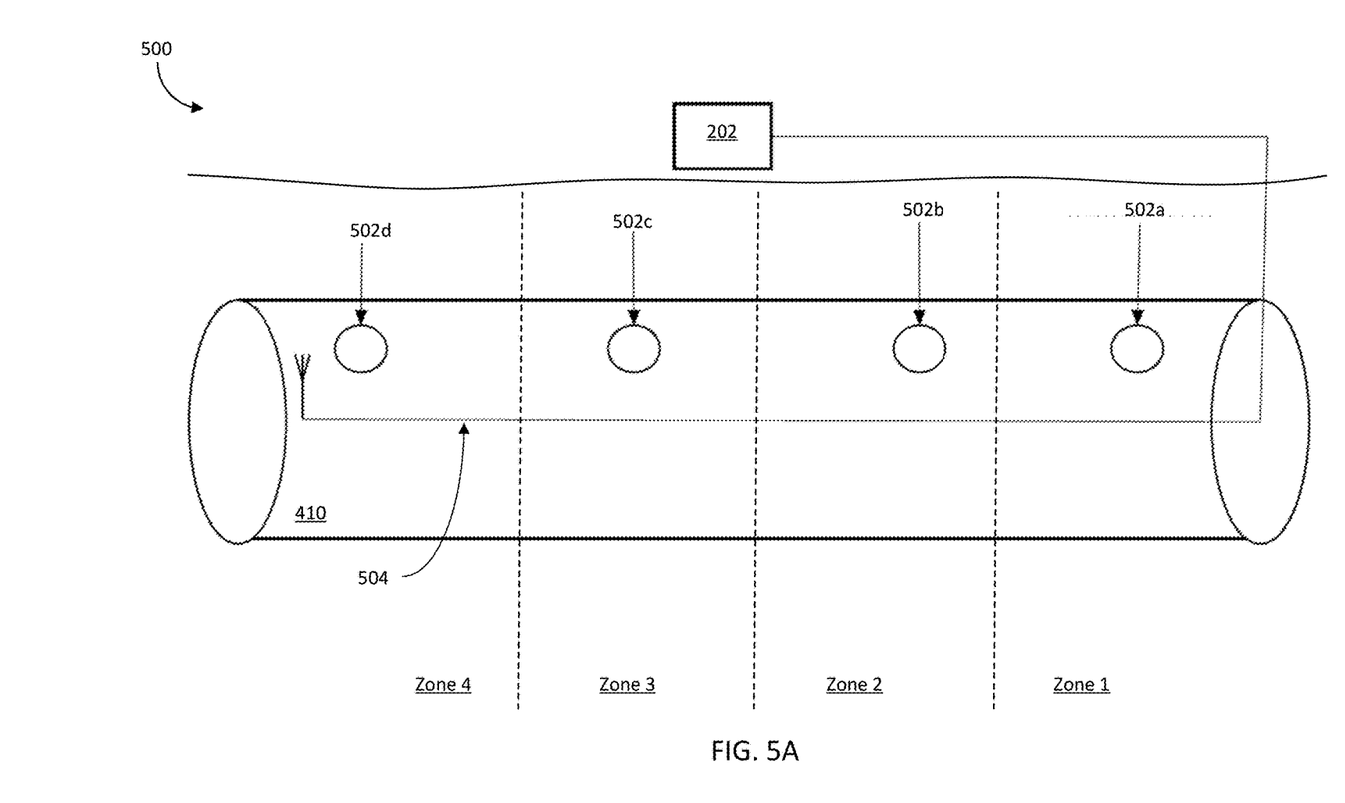
FIG. 5A is a block diagram of a control system as installed in a cured-in-place pipe, according to aspects of the present disclosure.

Referring now to FIGS. 5A-5D, a control system 500 as installed in a cured-in-place pipe is shown, according to aspects of the present disclosure. Referring specifically to FIG. 5A, the control system 500 is shown to include the controller 202 (which can be located above-ground, or otherwise proximal to the CIPP). As shown, temperature sensors 502a, 502b, 502c, 502d (e.g., temperature sensor(s) 210) can be disposed along the pipe 410. According to some aspects, the individual temperature sensors 502 can be adhered to a pipe wall (i.e., positioned between the pipe 410 and the CIPP). Alternatively, the temperature sensors 502 can be adhered to an exterior surface of the CIPP, still being disposed between the pipe 410 and the CIPP. During the installation of the CIPP within the pipe 410, the pressure of expanding the CIPP liner (as described above) can firmly secure the placement and position of the temperature sensors 502 between the pipe 410 and the CIPP liner.

As shown in FIG. 5A, the temperature sensors 502a, 502b, 502c, 502d can be wireless. An antenna wire 504 can be disposed proximal to the temperature sensors 502a, 502b, 502c, 502d, such that wireless data transmission can occur. The antenna wire 504 can be connected to the controller 202. The controller 202 (e.g., via the sensor input module 226) can receive temperature measurements from the temperature sensors 502, via the antenna wire 504. The antenna wire 504 may be disposed on or within the CIPP liner, such that the antenna wire 504 spans the length of the liner.

Conventional wireless data transmission between a sensor and a controller is not feasible over long distances, and/or through dense materials. In the case of CIPP systems, the sensor may be placed very deep underground (e.g., beneath rock, soil), which may significantly hinder data transmission to a controller above ground. However, the antenna wire 504 of the present disclosure enables wireless sensors to transmit data, regardless of pipe location or environment. This allows inexpensive, self-powered sensor modules to be utilized. Furthermore, the antenna wire 504 can be disposed within the CIPP liner, which can protect the wire and prevent damage.

As previously described, the pipe 410 may be divided into a plurality of zones. As shown by FIG. 5A, each zone can include one or more temperature sensors 502. As an example, "zone 1" can correspond to temperature sensor 502a, "zone 2" can correspond to temperature sensor 502b, "zone 3" can correspond to temperature sensor 502c, and "zone 4" can correspond to temperature sensor 502d. Additional temperature sensors 502 and, optionally, additional zones can be included in the control system 500. The controller 202 can store information corresponding to the temperature sensors 502 and the various zones within the sensor database 230 (as described above).

Figure 5B:
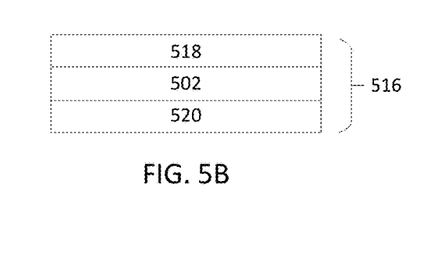
FIG. 5B is a side cross-sectional view of a sensor within the control system of FIG. 5A, according to some aspects of the present disclosure.

Referring specifically to FIG. 5B, a side cross-sectional view of a sensor module 516 including temperature sensor 502 is shown, according to some aspects of the present disclosure. As shown, the sensor module 516 can include the temperature sensor 502 disposed between a film 518 and an adhesive 520. The adhesive 520 can attach the sensor module 516 to the wall of the pipe 410. Accordingly, the film 518 can contact the CIPP liner. As an example, the film 518 can be a poly-based thin film which can be non-conductive. The film 518 can be rated to a curing temperature (e.g., 200 degrees Celsius). The adhesive 520 can be natural or synthetic rubber, acrylic-, urethane-, or silicone-based, among other adhesive types. Sensor module 516 can be adhered to the wall of the pipe 410. Accordingly, sensor module 516 can be attached or adhered such that contact with the CIPP liner occurs. In some implementations, the sensor module 516 can be configured without the film 518.

Figure 5C:
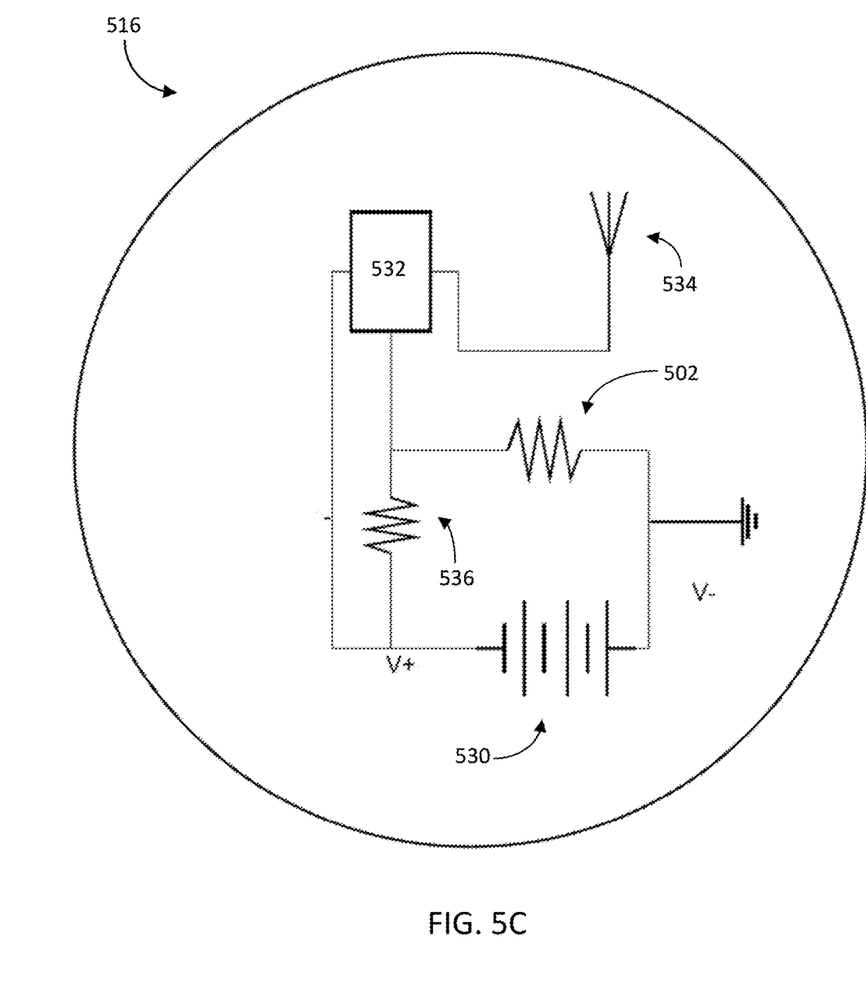
FIG. 5C is a schematic view of the sensors of FIG. 5B, according to some aspects of the present disclosure.

Referring specifically to FIG. 5C, a schematic view of the sensor module 516 including temperature sensors 502 is shown, according to aspects of the present disclosure. As shown, the sensor module 516 can include an internal power supply 530, which can supply power to an integrated circuit 532. In some aspects, the temperature sensor 502 can be a positive temperature coefficient (PTC) thermistor. In particular, the temperature sensor 502 can be a switching PTC. A resistor 536 having a known value (e.g., as stored within the sensor database 230), can be connected in parallel with the integrated circuit, such that a total circuit resistance (including the temperature sensor 502) can be determined. The integrated circuit 532 can transmit data (e.g., via small pulses of information) via the antenna 534. The antenna wire 504 can receive and transmit data between the integrated circuit 532 and the controller 202.

Figure 5D:
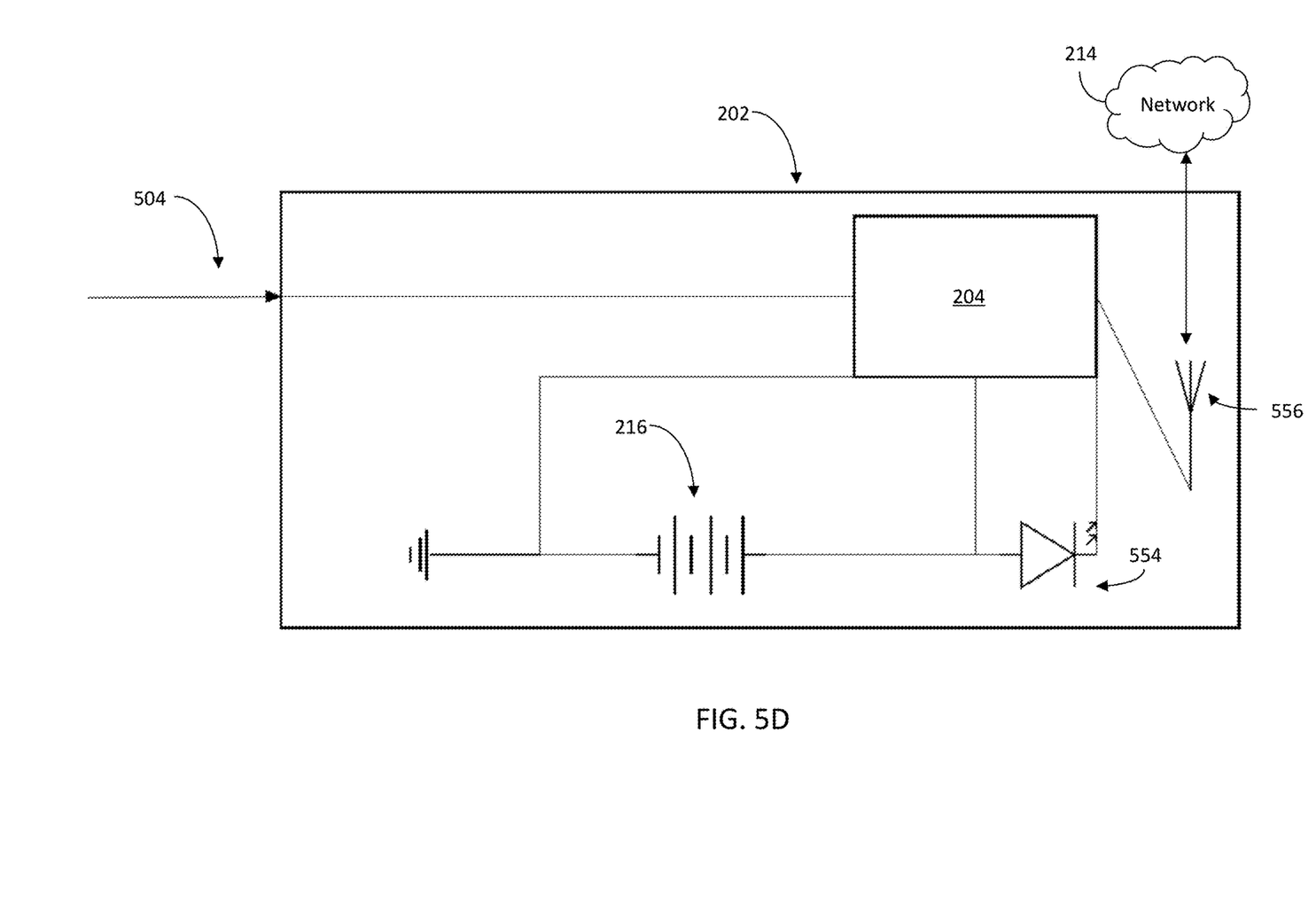
FIG. 5D is a schematic view of a controller within the control system of FIG. 5A, according to aspects of the present disclosure.

FIG. 5D shows a schematic view of the controller 202 within the control system 500, according to aspects of the present disclosure. The antenna wire 504 can extend from the pipe 410 to the controller 202. The controller 202 can further include a power indicator (e.g., LED power indicator 554), which may be visible through the controller housing 300. As shown, the processing circuit 204 can provide outputs to the network 214. This can be done via a wired or wireless connection (e.g., antenna 556).

According to the present disclosure, the control system 500 can be configured to implement switching PTCs to measure temperature (e.g., temperature sensors 502) via the wireless sensor module 516. Upon reaching a predetermined temperature (here, the minimum curing temperature), the switching PTCs change resistance. As described above, the minimum curing temperature may be selected based on the specific resin type and curing parameters. The controller 202 can detect the resistance change of the switching PTCs, which is associated with a temperature change at the pipe-liner interface.

Operationally, if a zone fails to reach the predetermined temperature, the controller 202 can output a status indicator (e.g., via the communications interface 224), indicating that the zone has failed to reach the minimum curing temperature. Alternatively, once each zone reaches the predetermined temperature (e.g., the minimum curing temperature), the controller 202 can output a status indicator (e.g., via the communications interface 224), indicating that all zones have reached the minimum curing temperature. The status indicator can be displayed via the LCD display 220, and/or transmitted via the network 214 to the CIPP system 250. Additionally, the network 214 can transmit the status indicator (and related data) to a remote user device. In some implementations, the status indicator can prompt the CIPP system 250 to maintain or update a control parameter. As an example, the CIPP system 250 may increase a temperature output in response to receiving the status indicator.

As described above, the sensor input module 226 within the controller 202 can communicate with the timing module 228 to determine elapsed time since reaching the minimum curing temperature. This data can subsequently be provided to the analysis module 234, which can analyze the curing process in real-time. In some configurations, the integrated circuit 532 can perform the functions described with respect to the sensor input module 226 and/or the timing module 228 of the controller 202. Accordingly, resistance values may be converted to temperature values prior to transmission to the controller 202.

Figure 6:
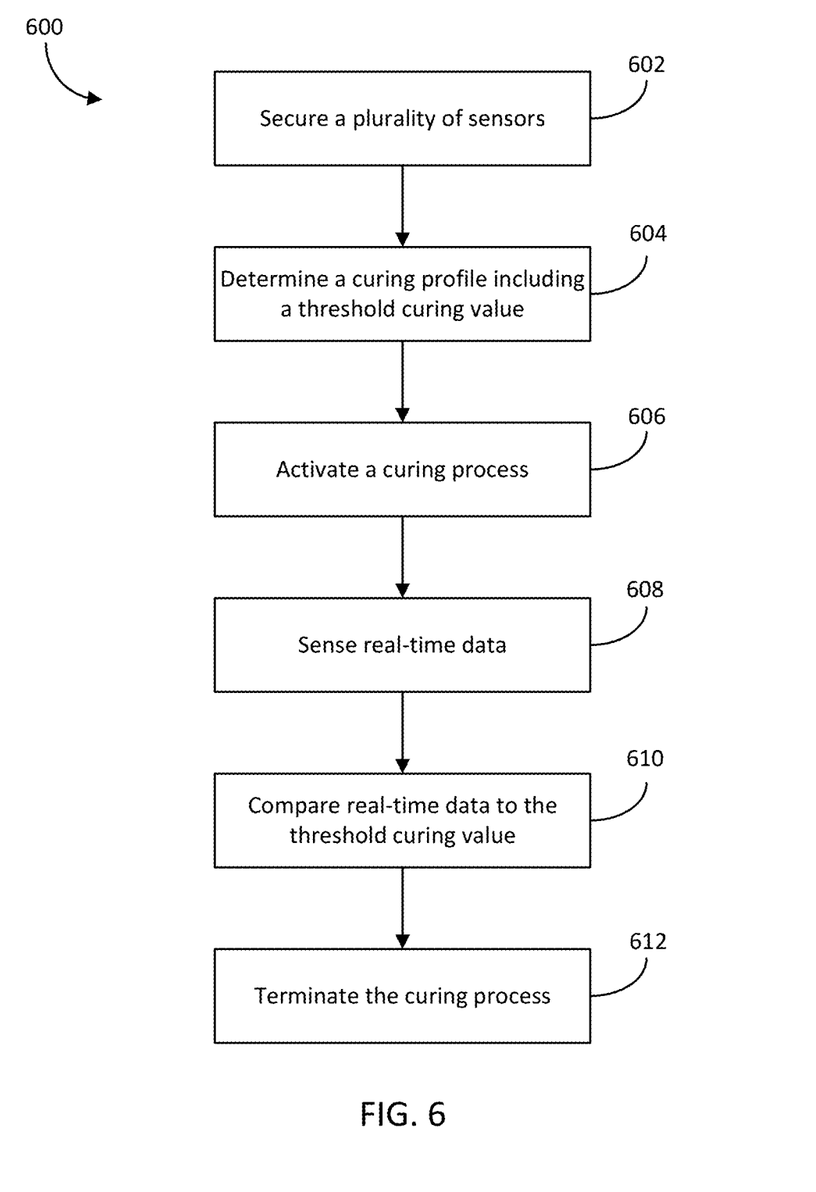
FIG. 6 is a process diagram of a control method, according to aspects of the present disclosure.

Referring now to FIG. 6, a process 600 for monitoring a curing process is shown, according to aspects of the present disclosure. Process 600 is shown to include securing a plurality of sensors (process block 602). The plurality of sensors can be secured to an interface between a resin layer and an existing pipe. Process 600 is shown to further include determining a curing profile of the cured-in-place pipe, the curing profile including a threshold curing value (process block 604). Additionally, process 600 is shown to include activating a curing process (process block 606). Process 600 is shown to further include sensing (e.g., via the plurality of sensors) real-time data (process block 608). The data may be indicative of at least one curing parameter. Additionally, process 600 includes comparing the real-time data from each sensor to the threshold curing value (process block 610). Process 600 further includes terminating the curing process (process block 612). Termination may occur upon the real-time data meeting or exceeding the threshold curing value.

It will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the present disclosure and claims. The entire disclosure of each patent and publication cited herein is incorporated by reference, as if each such patent or publication were individually incorporated by reference herein.

I claim:

1. A method for monitoring a curing process of a cured-in-place pipe, the method comprising:
    positioning a plurality of sensors against an interior surface of an existing pipe;
    after positioning the plurality of sensors, inserting a liner into the existing pipe so as locate the sensors between a resin layer of the liner and the existing pipe;
    electrically coupling each of the sensors to a controller using a wired connection;
    determining a curing profile of the cured-in-place pipe, the curing profile including a threshold curing value;
    activating the curing process;
    sensing, using the plurality of sensors, real-time data indicative of at least one curing parameter;
    comparing the real-time data from each sensor to the threshold curing value; and
    outputting an alert upon the real-time data meeting or exceeding the threshold curing value.

2. The method of claim 1, wherein the curing profile comprises a plurality of zones, each zone including one of the plurality of sensors, the method further comprising:
    comparing, for each zone, the real-time data from the sensor to the threshold curing value; and
    displaying the comparison for each zone via a display.

3. The method of claim 1, wherein activating the curing process comprises applying heat to the liner including the resin layer, and wherein the method further comprises terminating the curing process by ceasing heat application to the liner.

4. The method of claim 1, wherein positioning the plurality of sensors comprises securing the plurality of sensors to the interior surface of the existing pipe by applying an adhesive strip to an interior wall of the existing pipe, the adhesive strip configured to house the plurality of sensors.

5. The method of claim 1, wherein the plurality of sensors are configured to measure real-time variable resistance, and wherein the at least one curing parameter is a temperature at the interface between the resin layer and the existing pipe.

6. The method of claim 5, wherein the plurality of sensors are switchable positive temperature coefficient thermistors connected in parallel, and wherein the real-time data comprises a combined total resistance of the plurality of sensors.

7. The method of claim 6, wherein the threshold curing value comprises at least one of a minimum curing temperature and a minimum curing time, respectively associated with the resin.

8. The method of claim 5, wherein the plurality of sensors are silistor positive temperature coefficient thermistors.

9. The method of claim 8, wherein each sensor of the plurality of sensors corresponds to a zone of the existing pipe,
    wherein the comparing step comprises comparing, for each zone, the real-time data from the sensor to the threshold curing value; and
    wherein the outputting step comprises outputting the alert upon the real-time data, for all zones, meeting or exceeding the threshold curing value.

10. The method of claim 9, further comprising:
    terminating the curing process upon the real-time data, for all zones, meeting or exceeding the threshold curing value.

11. The method of claim 1, wherein the plurality of sensors are disposed between multiple layers of material, at least one of the layers comprising a film.

12. The system method of claim 11, wherein the plurality of sensors are configured to transmit the real-time data to the controller, via at least one wire disposed between the multiple layers of material.

13. A method for monitoring a curing process of a cured-in-place pipe, the method comprising:
    positioning a plurality of sensors proximal to a resin layer of a liner, the plurality of sensors electrically coupled in parallel to a controller;
    determining a curing profile corresponding to at least the resin layer, the curing profile including a threshold curing value;
    sensing, using the plurality of sensors, real-time data indicative of at least one curing parameter;
    comparing the real-time data from each sensor to the threshold curing value; and
    outputting an alert upon the real-time data meeting, exceeding, or failing to meet the threshold curing value.

14. The method of claim 13, wherein determining a curing profile comprises determining a minimum curing temperature, a minimum curing pressure, and a minimum curing time.

15. The method of claim 13, wherein the plurality of sensors are configured to measure real-time variable resistance, and wherein the at least one curing parameter is a temperature at an interface between the resin layer and the pipe.

16. The method of claim 15, wherein the plurality of sensors are switchable positive temperature coefficient thermistors, and wherein the real-time data comprises a combined total resistance of the plurality of sensors.

17. The method of claim 16, wherein the threshold curing value comprises at least one of a minimum curing temperature and a minimum curing time, respectively associated with the resin.

18. The method of claim 17, wherein each sensor of the plurality of sensors corresponds to a zone of the pipe,
   wherein the comparing step comprises comparing, for each zone, the real-time data from the sensor to the threshold curing value; and
   wherein the outputting step comprises outputting the alert upon the real-time data, for all zones, meeting or exceeding the threshold curing value.

19. The method of claim 13, wherein the plurality of sensors are disposed between multiple layers of material, at least one of the layers comprising a film.

20. The method of claim 19, wherein the plurality of sensors are configured to transmit the real-time data to the controller, via at least one wire disposed between the multiple layers of material.

* * * * *